United States Patent [19]
Kankkunen

[11] Patent Number: 4,751,033
[45] Date of Patent: Jun. 14, 1988

[54] METHOD OF COMPACTING CONCRETE BY MUTUALLY SYNCHRONIZED RECIPROCATING MOVEMENTS

[75] Inventor: Heikki Kankkunen, Forssa, Finland

[73] Assignee: Rakennusvalmiste Oy, Forssa, Finland

[21] Appl. No.: 801,778

[22] Filed: Nov. 26, 1985

[30] Foreign Application Priority Data

Nov. 29, 1984 [FI] Finland .................................. 844685

[51] Int. Cl.[4] ......................... B28B 1/08; B28B 21/14; B29C 43/04

[52] U.S. Cl. ......................................... 264/71; 264/72; 425/432

[58] Field of Search ............................. 264/70, 71, 72; 425/429, 432, 430

[56] References Cited

U.S. PATENT DOCUMENTS

| | | | |
|---|---|---|---|
| 2,057,466 | 10/1936 | Willetts | 264/71 |
| 2,147,836 | 2/1939 | Gaskell | 425/415 |
| 2,193,847 | 3/1940 | Strong | 264/71 |
| 2,256,361 | 9/1941 | Straub | 264/71 |
| 2,313,716 | 3/1943 | Akers | 425/429 |
| 3,001,260 | 9/1961 | Gagne | 425/429 |
| 3,146,996 | 9/1964 | Irving | 366/110 |
| 3,273,217 | 9/1966 | Chanlund | 366/111 |
| 3,402,228 | 9/1968 | Wood et al. | 264/71 X |
| 3,528,144 | 9/1970 | Haponski | 425/432 |
| 3,611,516 | 10/1971 | O'Connor et al. | 425/432 |
| 3,639,550 | 2/1972 | Darmochwal | 264/71 X |
| 4,432,717 | 2/1984 | Viemon | 425/430 X |
| 4,531,903 | 7/1985 | Frey et al. | 425/429 |
| 4,539,165 | 9/1985 | Paakkinen | 264/23 |
| 4,568,503 | 2/1986 | Laine et al. | 264/70 |
| 4,574,064 | 3/1986 | Paakkinen | 264/70 |

*Primary Examiner*—Jan H. Silbaugh
*Assistant Examiner*—Karen D. Kutach
*Attorney, Agent, or Firm*—Birch, Stewart, Kolasch & Birch

[57] ABSTRACT

A method for compacting a concrete mix in a casting mold into which the concrete mix is poured between at least two opposite and approximately parallel mold walls. The opposite mold walls are moved in a push-pull manner and essentially on the plane of the walls so that the concrete mix is subjected by the frictional action from the mold walls to an internal compacting shear produced by contradirectional movement of the opposite mold walls.

7 Claims, 1 Drawing Sheet

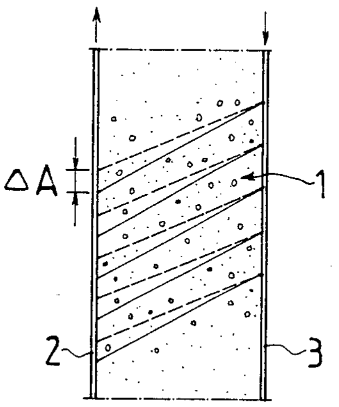
Fig. 1
Fig. 4
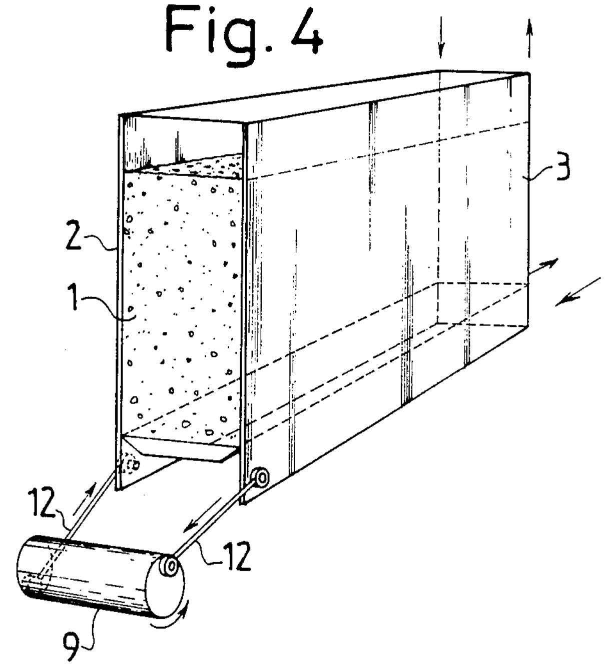
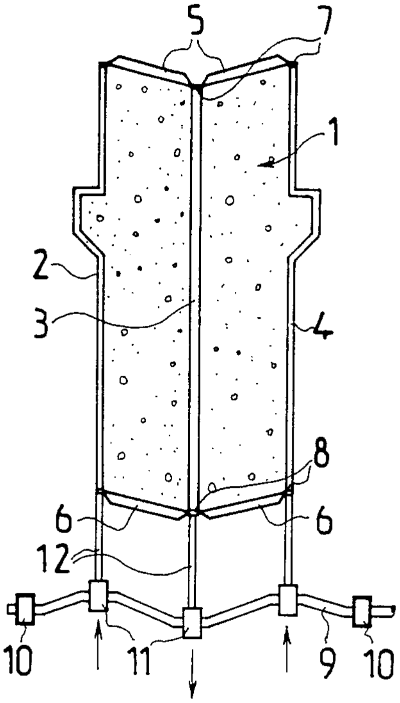
Fig. 2
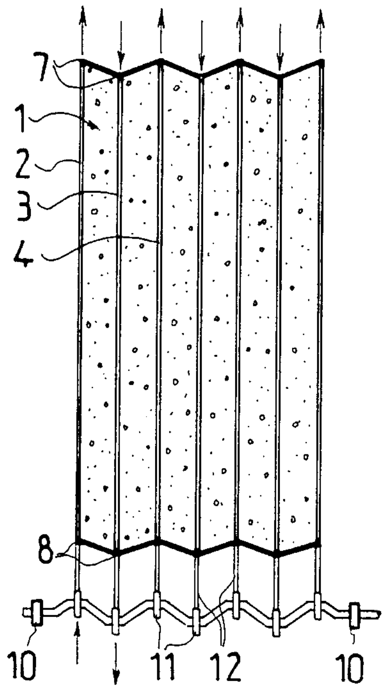
Fig. 3

METHOD OF COMPACTING CONCRETE BY MUTUALLY SYNCHRONIZED RECIPROCATING MOVEMENTS

BACKGROUND OF THE INVENTION

1. Field of the Invention

The present invention relates to a method for compacting concrete in a mold.

2. Description of the Prior Art

Methods for fabrication of concrete elements by using different types of molds are known in the prior art. The molds are generally fabricated of steel, wood, concrete, or some other stiff plate material. The molds are dimensioned to withstand the casting pressure during concrete pouring and compaction without appreciable deformation. In addition, the molds must be capable of being dismantled after the concrete has set. When the molds are assembled and stiffly supported, the casting proper can be started. The casting is generally carried out by loading concrete into the mold in small quantities by vibrating the mold simultaneously or by using separate vibrators for compaction. Filling the mold is continued by adding concrete in small quantities until the mold is filled up to the rim and the upper surface can be smoothed. Various vibrating methods are applied in prior art casting procedures, according to mold size, shape and concrete mix stiffness.

Common vibrators are of the high-frequency vibrating type, which are stiffly mounted to the mold and integrally transfer the vibration energy to the cast concrete. Especially with molds of light construction, another conventional method is to use a high-frequency vibrator rod which is transported or transferred according to the progress of the casting process to the point where compaction is desired.

Combinations of the aforementioned methods are also used in the prior art. Equally well known is the procedure of applying a method known as shock compaction in horizontally cast elements to compact concrete by sharp blows at a low repetition rate.

However, all the aforementioned methods and equipment suffer from the following drawbacks:

In all vibrating methods, which utilize high-frequency vibration, the process generates high-intensity acoustic noise that is difficult to attenuate or eliminate. Also in the shock method, the noise level is high due to the high impact energy. In addition, the transfer of vibration energy from the vibrators to the concrete mix requires extremely stiff mold constructions to allow the vibration energy to spread sufficiently far into the mix, or when using molds of light construction, several vibrators must be used. All these arrangements result in high vibration forces, heavy mold constructions, and simultaneously a low efficiency of energy utilization in compaction. Furthermore, the high acoustic noise level exceeds generally accepted limit values if no acoustic damping countermeasures are provided, leading to health hazards.

SUMMARY OF THE INVENTION

The aim of the invention is to overcome the drawbacks of prior art techniques and to present an entirely new method of concrete compaction.

The method according to the invention is based on effecting concrete compaction by internal rotating shear in concrete, produced by contradirectional movement of opposite mold walls.

The method offers appreciable advantages. The method is applicable for casting both fluid and stiff concretes. Moreover, the invention facilitates the fabrication of thinner constructions than those previously achieved. The compactness of concrete surfaces is also improved.

BRIEF DESCRIPTION OF THE DRAWINGS

In the following, the invention will be examined in more detail by means of the exemplifying embodiments in accordance with the attached drawings.

FIG. 1 shows the principle of the compaction method in accordance with the invention.

FIG. 2 shows in a schematic view an embodiment of the method for molding concrete elements of the beam-supporting pillar type.

FIG. 3 shows in a schematic view an embodiment of the method for molding concrete pile elements.

FIG. 4 shows in a schematic view an embodiment of the method for molding concrete elements using a battery mold.

DESCRIPTION OF THE PREFERRED EMBODIMENTS

According to the schematic drawing of FIG. 1, the compaction of concrete mix 1 is achieved by moving mold walls 2 and 3 for a longitudinal displacement of $\Delta A$ to generate an internal shear in concrete mix 1. This causes compaction in the concrete under the pressure of its own weight, disposing with the need for additional vibration. When the concrete mix is poured into the mold, due to several physical factors (surface tension, cohesion, or mold surface roughness), a static friction is generated between the mold surface and the concrete mix, preventing the gliding of the concrete mix along the mold surface. In this situation, under the shear imposed by the moving mold surfaces, the concrete mix yields, shears or twists internally rather than glides in respect to the surface. Consequently, by moving the mold walls 2, 3 reciprocatively, the concrete mix is effectively compacted by the shear action, causing the entrapped air pockets and bubbles to be driven up and out.

The appropriate length or speed of mold surface shear movement depends on the concrete mix stiffness and the thickness of the cast concrete structure. The preferable amplitude of the shear movement is about 3 . . . 50 mm for normal structures. However, the frequency of shear movement is not essential for the compaction and, consequently, can vary rather widely, for instance, within a range of 0.5 . . . 2000 strokes per second, preferably chosen as 1 . . . 50 strokes/s (0.5 . . . 25 Hz).

In accordance with the invention, the twin mold construction 2 . . . 8 shown in FIG. 2 permits simultaneous casting of two beam-supporting pillars. One cavity of the mold is delineated by mold walls 2 and 3, the other by mold walls 3 and 4, respectively. The mold end plates 5 and 6 are connected, e.g. with hinge constructions 7 and 8 to the end of walls 2, 3, and 4.

The mold walls 2, 3, and 4 are connected at one end of each wall, respectively, via jointed bars 12 and associated bearings 11 to a camshaft-type actuator 9, which is permanently fixed by bearings 10. When the actuator 9 rotates, on one hand, the outer walls 2 and 3 and on the other hand the common inner wall 3 move parallel in the wall direction, causing the desired shear action in the concrete mix 1.

The reciprocating movement of opposite walls 2, 3, and 4 can also be effected using other prior art methods. The mold sealing at the moving walls 2, 3, 4, and for joints 7, 8 of the ends 5, 6 generates no problems as it can be arranged using conventional flexible seals known in prior art. Neither will the reinforcements in the elements be damaged or displaced since the displacement of walls 2, 3, and 4 is rather short and does not occur on a plane in which the element cross section is changing.

The row-type casting mold of FIG. 3 allows the simultaneous fabrication of six concrete pile elements. The inner walls 3, 4 of the structure can be made rather thin. Because the construction is analogous with that of FIG. 2, the even and odd numbered walls, respectively, are moving reciprocally on a platform not shown.

FIG. 4 exemplifies the application of the invention to a conventional battery mold. The advantages of the invention are especially accentuated in high battery molds. By a movement of mold walls 2, 3 in reciprocal directions either horizontally or vertically, the concrete mix 1 is compacted under the pressure of its own weight, resulting in compact element surfaces and stiffer concrete without vibrating the mix. In this embodiment the actuator is provided by a rotating drum 9 driving in push-pull arrangement jointed bars 12 which are attached to mold walls 2 and 3.

The mold surface can also be roughened to eliminate glide between the surface and the concrete mix.

What is claimed is:

1. A method for compacting a concrete mix in a casting mold comprising the steps of placing concrete mix in a casting mold between at least two parallel opposite mold walls, contacting at least a part of said mold walls with said concrete mix, moving said mold walls in the direction of said walls in a contradirectional reciprocating movement wherein said reciprocating movement is mutually synchronized, and thereby subjecting said concrete mix to internal compacting shear caused by frictional contact of said mold walls with said concrete mix.

2. A method as claimed in claim 1, wherein moving said mold walls takes place rectilinearly.

3. A method as claimed in claim 2, wherein moving said mold walls takes place horizontally.

4. A method as claimed in claim 2, wherein moving said mold walls takes place vertically.

5. A method as claimed in claim 1, wherein moving said mold walls takes place at a frequency of from 0.25 to 1000 Hz.

6. A method as claimed in claim 1, wherein moving said mold walls takes place at a frequency of from 0.5 to 25 Hz.

7. A method as claimed in claim 1, comprising a further step of roughening inner surfaces of said mold walls to improve said frictional contact.

* * * * *